*A. Young,*
*Unloading Canal Boats,*
Nº 10,843. Patented May 2, 1854.
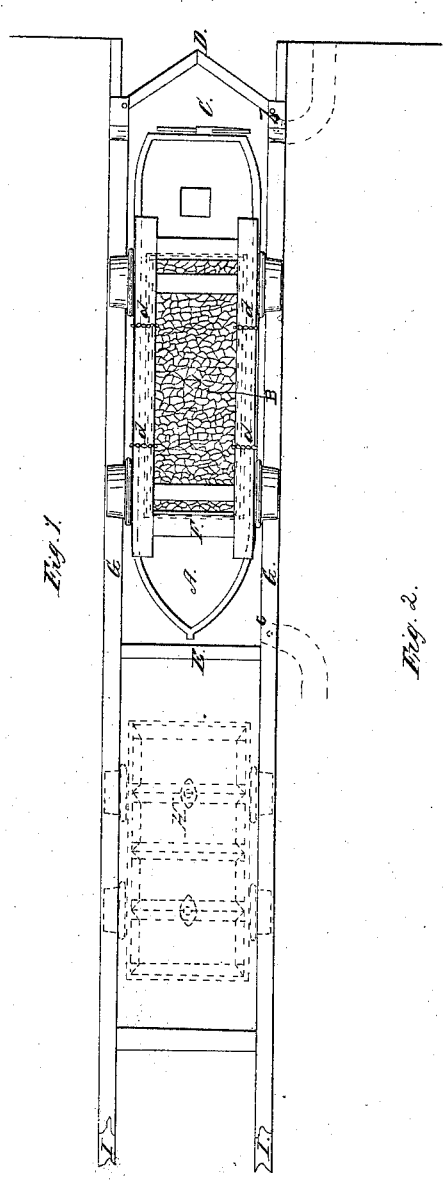
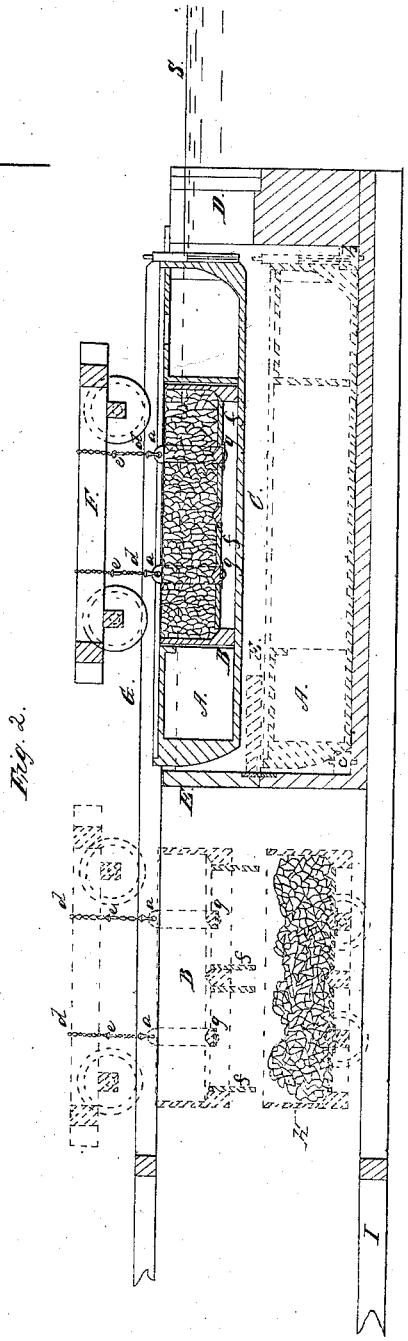

UNITED STATES PATENT OFFICE.

AMOS YOUNG, OF GEORGETOWN, DISTRICT OF COLUMBIA.

METHOD OF DISCHARGING CARGO FROM CANAL-BOATS.

Specification of Letters Patent No. 10,843, dated May 2, 1854.

*To all whom it may concern:*

Be it known that I, AMOS YOUNG, of the city of Georgetown, District of Columbia, have invented a new and Improved Method of Discharging Cargo from Canal-Boats and other Vessels, of which the following is a full, clear, and exact description, reference being had to the accompanying drawing, which forms part of this specification, and in which—

Figure 1 represents a plan or top view of a canal boat within a dry dock with the several devices pertaining to my improvement showing the same previous to the water being run off from the dock and the discharge of the cargo from the boat; Fig. 2 represents a longitudinal vertical section of the dock, boat and its several devices in a similar relation or condition, and further represents, in dotted blue lines, the boat in its position when the water is run off from the dock and the contrivances for discharging or transferring the cargo are in their proper relative positions or situations for transferring the load and after having discharged it from the boat.

In discharging or transferring coal and other cargo from canal-boats, the ordinary bucket and derrick process is laborious, tardy, inconvenient and expensive. It has therefore been proposed to facilitate this operation and avoid expensive branch cuts from the canal, by causing the boat to settle within a dry dock and discharging the cargo either through valve or trap door openings in the bottom of the boat and dock, where the canal stands at a sufficient elevation for so discharging the cargo, or, by causing the cargo to be carried by a truck or trucks within the boat and, upon the boat settling at the bottom of the dock, running out the cargo through the end of the boat, the said end being arranged to open for the removal of the truck. The first of these plans is, generally speaking, practicable only where the canal is situated at a considerable elevation above the depot or vehicle or vessel into which it is designed to discharge or transfer the cargo, and in the majority of instances would involve the necessity of building the dry dock at or over the depot or vessel and connecting it, by an expensive branch cut, with the main cut of the canal; but a more serious objection to this plan is to be found in the peculiar construction of the dry dock and boat the trap door openings in which it is almost impossible to keep water tight especially where the cargo is coal or other like substance the dust from which is apt to lodge and prevent the close shutting of the valves, and this objection applies in part, but not very seriously so, to the second of the plans, before specified, in which the end of the boat is made to open for the discharge of the cargo, but with this latter plan no branch cut is requisite as the trucks containing the cargo are run out from the boat at the level of the fall in the dry dock to any place of discharge and the cargo is discharged with facility and despatch. But, though among those arrangements involving a peculiar construction of the boat, that plan is the best which is the simplest and affords the greatest facility in discharging at or from the least difference in level below that of the canal or draft level of the cargo, there are many situations in which the cargo from a canal boat could not be discharged below the draft level without involving a considerable amount of labor to afterwards elevate the cargo to or over its place of deposit, as, for instance, where the canal lies at only a slightly higher elevation than an adjoining river in which a lighter or vessel lies to receive the cargo, and in many other instances connected with the transfer of cargo whether for sea, coast or inland traffic.

To admit of the cargo being discharged from the boat at a level not lower than the draft of the boat when carrying the cargo, in a simple and convenient manner, without involving any necessary peculiar construction of the boat in the way of trap door openings in its bottom, ends, &c., which, by only ordinary usage, are liable to derangement and are, on many accounts, objectionable, and to afford every facility for transferring the cargo without the interposition of a branch cut from the canal, forms, in a general way, the object of this my invention.

The boat (A), represented in the accompanying drawing, may be of the ordinary build and construction of canal boats, or it may be made somewhat lighter at its sides and ends as the cargo within it is borne by and contained within one or more boxes (B). This cargo box (B) rests on the bottom of the boat and may be of the depth and width of the boat; it is provided with side straps (*a*) which project above the top edges of the box for the purpose of linking chains thereto.

To discharge the cargo from the boat, the boat is drawn from the main cut (S) of the canal into a dock (C) which is furnished with gates (D and E) at its ends and has sluices or valves (b and c) to admit water from the canal or discharge it from the dock accordingly as it is required to float the boat in or out or dry dock it; these valves and gates may be operated by any suitable mechanical contrivances from above or outside, much in a similar manner to that of operating locks or dry docks for other purposes.

The boat being floated within the dock and the gates closed, the cargo box (B) is made fast to a truck (F), overhead, which runs upon a suspension rail-road (G), the connection between the suspension truck and cargo box being established by chains (d) that hook into the straps (a) of the box and, passing around the side pieces of the truck, are made to form a carrying loop by hooks (e) which hitch into the links of the chains at any desired point or height to keep the chains taught, according to the draft of the loaded boat and level of water in the dock and canal. The back sluice (c) is then opened and the water allowed to run off from the dock which causes the boat to settle on the bottom thereof, as represented in dotted blue lines (Fig. 2), while the cargo box is left suspended to the truck (F) above. The back dock gate (E) is then opened, as represented in dotted blue lines (Fig. 2), and the truck (F) carrying the box run off to its place of discharge along the rails (G) which at their commencement may be slightly inclined to start the truck or facilitate its movement.

Trap doors (f) are formed in the bottom of the box (B) to discharge the cargo; these doors open, as is represented by dotted blue lines in Fig. 2, when the suspension truck and cargo box have been run off from the dock and may be supposed to have arrived at or over the required point of discharge which may be either that of a depot, over a lighter or vessel in a river beneath, cart, plain or dumping wagon, or rail-road truck (H). And thus the cargo is discharged from the boat, at the draft level of the same in the canal, in a most expeditious and simple manner.

Swivel catches (g) serve to keep the trap doors closed while carrying cargo, but any other devices for this purpose may be adopted, such as side catches or bolts that may be operated by a lever on the outside.

No branch cut, it will be observed, is requisite from the canal, and no side or end openings for the discharge of the cargo made in the boat while the weight of the cargo may be spread over the whole bottom of the boat by building the cargo boxes at their bottom of similar shape to that of the floor of the boat. Where no more fall is obtainable for the discharge of the cargo than is given by the elevation of the cargo box at the draft level, the suspension railroad may be continued for the entire distance to the place of discharge and suitable provisions of switches or turn tables made for diverting the run of the truck or trucks and cargo box or boxes to different points of discharge as in some instances may be desired, especially where the cargo in the boat is carried by two or more boxes, one in front of the other, as it is designed should be the case in order to reduce weight and render the removal of the cargo from the boat more convenient in many respects. But where a greater fall for the discharge of the cargo, than that of the draft level of the boat, is attainable, it may be preferable to transfer the cargo, after it is run from the dock, into a truck (H) beneath, and this latter truck, which is provided with trap door openings in its bottom, made to convey the cargo to its place of discharge and discharge it as required while the suspension truck with the empty cargo box is run back to its place over the dock, the back dock gate and sluice closed, front sluice opened and the boat floated to receive the cargo box which should then be detached from the suspension truck and, upon opening the front dock gates, the boat drawn off into the canal for further traffic; by which arrangement of the lower receiving or transfer truck (H), considerable time as regards discharging from the boat will be saved, while the surface or ground rail-road (I) on which the lower truck travels may be found more convenient than the suspension rail-road might be for the arrangement of the switches to divert the run of the cargo trucks to their several places of discharge and will offer little or no obstruction to general traffic on the ground over which it passes. The lower track (I) also may serve as a branch to any main line of rail-road to which it is designed to transfer the cargo and the ordinary rail-road truck be run along the branch to its place under the suspended cargo-box (B) to receive the cargo, as described, and convey it on to the main route. Thus a great saving will be effected in the transfer of cargo. But I would have it understood that this method of discharging cargo is perfect without the addition of the lower truck (H), or indeed without any truck except that of the cargo box or boxes which may be provided with carrying wheels above that, upon the boat floating into the dock, stand at a sufficient height to clear the tops of the suspension rails, but, upon the boat settling in the dock when the water is drawn off, serve to prevent the cargo-box falling with the boat by the wheels attached to the cargo box resting on the rails and suspending the cargo in a similar manner, for the purpose of running it off at the draft level, to that already described in which a separate truck (F) is used. But if a separate truck (F) be adopted, a variety of devices, in the place of the chains (d), may be employed to connect the cargo box to the truck, and the mechanical arrangements generally be variously modified as for instance in the construction of the cargo box or truck which may be built or operated to discharge the cargo from it in many different ways in the place of that specified for the action of the falling trap doors; or the lower truck (H) may be made to catch the cargo-box, after it is drawn from the dock along the suspension rails, and convey it to any distant place of discharge; the lower truck in such case being of platform instead of box build. These and other modifications however it is not deemed necessary to dwell upon.

I do not claim as new, of themselves, any of the devices herein named; but

I do claim, as new and useful and desire to secure by Letters Patent—

The method herein described of discharging and transferring coal or cargo from canal-boats by causing the boat to free itself of its cargo by the settling or falling of the boat in the dock in drawing off the water from the latter, in such a manner that, the cargo—contained in one or more cargo-boxes or trucks provided with suspension truck attachments or devices, as specified—is left suspended, at its draft or floating level in the canal, on a suspension track or railroad built on the sides of or over the dock; whereby the cargo may be discharged from the boat with despatch, and with but little labor, and be run off, at a high level, to any distant place of transfer and there be transferred from one receptacle to another without inconveniently detaining the boat, and whereby the many other advantages herein specified are obtained; the said cargo-box with its suspension truck attachments or devices, boat, dock and suspension track or railroad being arranged and operating together as herein set forth, and the whole serving to economise time, labor and reduce the cost of transit and delivery at a high level, in a practicable manner, as specified.

In testimony whereof, I have hereunto subscribed my name.

A. YOUNG.

Witnesses:
　SAML. GRUBB,
　A. GREGORY.